United States Patent
Rogers et al.

(10) Patent No.: US 10,944,602 B1
(45) Date of Patent: Mar. 9, 2021

(54) PASSIVE LINEAR EQUALIZER FOR SERIAL WIRELINE RECEIVERS

(71) Applicant: Analog Bits Inc., Sunnyvale, CA (US)

(72) Inventors: Alan C. Rogers, Palo Alto, CA (US); Mohammad Mahdi Ahmadi, Tehran (IR)

(73) Assignee: Analog Bits Inc., Sunnyvale, CA (US)

(*) Notice: Subject to any disclaimer, the term of this patent is extended or adjusted under 35 U.S.C. 154(b) by 0 days.

(21) Appl. No.: 16/567,721

(22) Filed: Sep. 11, 2019

(51) Int. Cl.
*H04L 25/03* (2006.01)

(52) U.S. Cl.
CPC .............................. *H04L 25/03885* (2013.01)

(58) Field of Classification Search
CPC ................................................. H04L 25/03885
USPC ................................... 375/232, 231, 230, 229
See application file for complete search history.

(56) References Cited

U.S. PATENT DOCUMENTS

| | | | | |
|---|---|---|---|---|
| 5,180,990 A | * | 1/1993 | Ohkuma | H03G 5/025 330/304 |
| 6,731,683 B1 | * | 5/2004 | Fiedler | H04L 7/0058 375/232 |
| 6,819,166 B1 | * | 11/2004 | Choi | H04L 25/03885 327/551 |
| 7,560,969 B2 | | 7/2009 | Chu | |
| 9,647,618 B1 | | 5/2017 | Yuan et al. | |

OTHER PUBLICATIONS

PCT International Search Report and Written Opinion in International Appln. No. PCT/US2020/050259, dated Oct. 6, 2020, 9 pages.

* cited by examiner

*Primary Examiner* — Ted M Wang
(74) *Attorney, Agent, or Firm* — Fish & Richardson P.C.

(57) ABSTRACT

Some implementations provide a passive equalizer section configured to filter an input signal, the passive equalizer section including: a first passive filter that comprises: a first resistor characterized by a first resistance, and a first reactive component characterized by a first reactance, wherein the first resistor and the first reactive component are in series and connected at a first connection node; and a second passive filter that comprises: a second resistor characterized by a second resistance, and a second reactive component characterized by a second reactance, wherein the second resistor and the second reactive component are in series and connected at a second connection node; and a signal mixing section comprising a plurality of transistors to mix signals with different frequency response characteristics.

20 Claims, 7 Drawing Sheets

PASSIVE LINEAR EQUALIZER FOR SERIAL WIRELINE RECEIVERS

TECHNICAL FIELD

The disclosure generally relates to high-speed wireline link receiver and in particular to passive linear equalization for serial wireline receivers.

BACKGROUND

High-speed wireline link receiver is widely used in broadband communication system that power the Internet and big data infrastructure.

SUMMARY

In one aspect, some implementations provide an equalizer circuit that includes: a passive equalizer section coupled to at least one input node, the passive equalizer section configured to filter an input signal and including: a first passive circuit comprising a first resistor characterized by a first resistance, and a first reactive component characterized by a first reactance, and coupled to the at least one input node, wherein the first reactive component is coupled to the first resistor at a first connection node, and wherein the first passive circuit is disposed between the at least one input node and a first common node; and a second passive circuit comprising a second resistor characterized by a second resistance, and a second reactive component characterized by a second reactance, and coupled to the at least one input node, wherein the second reactive component is coupled to the second resistor at a second connection node, and wherein the second passive circuit is disposed between the at least one input node and a second common node; a signal mixing section coupled to the passive equalizer section and comprising: a first transistor coupled to the first passive circuit at the first connection node and configured to receive a first signal therefrom; and a second transistor coupled to the second passive circuit at the second connection node and configured to receive a second signal therefrom, wherein the signal mixing section is configured to: mix the first signal and the second signal with respective frequency response characteristics; and generate an output signal.

Implementations may include one or more of the following features.

The passive equalizer may be coupled to two input nodes. The first passive circuit may include a first arm connecting a first input node to a first common node, the first arm including a first reactive component characterized by a first reactance and a first resistor characterized by a first resistance, wherein the first reactive component and the first resistor are connected in series at a first connection node; and a second arm connecting a second input node of the two input nodes of the receiver to the first common node, the second arm including a second reactive component characterized by the first reactance and a second resistor characterized by the first resistance, wherein the second reactive component and the second resistor are connected in series at a second connection node. The second passive circuit may include: a third arm connecting the first input node of the two input nodes of the receiver to a third common node, the third arm including a third reactive component characterized by a second reactance and a third resistor characterized by the second resistance, the third reactive component and the third resistor are connected in series at a third connection node; and a fourth arm connecting the second input node of the two input nodes of the receiver to a fourth common node, the fourth arm including a fourth reactive component characterized by the second reactance and a fourth resistor characterized by the second resistance, wherein the fourth reactive component and the fourth resistor are connected in series at a fourth connection node. The signal mixing section may include two pairs of differential input terminals, the first differential input terminal coupled to the first passive circuit at the first connection node and the second connection node, and the second differential input terminal coupled to the second passive circuit at the third connection node and the fourth connection node.

The signal mixing section may include a differential amplifier comprising: a first differential pair of transistors including: a first transistor including a first gate connecting to the first arm of the first passive circuit at the first connection node; and a second transistor including a second gate connecting to the second arm of the first passive circuit at the second connection node; a second differential pair of transistors including: a third transistor including a third gate connecting to the first arm of the second passive circuit at the third connection node; and a fourth transistor including a fourth gate connecting to the second arm of the second passive circuit at the fourth connection, wherein drain terminals of the first transistor and the third transistor may be shorted together, and wherein drain terminals of the second transistor and the fourth transistor may be shorted together.

The first common node and the second common node may be connected. The first passive circuit may be a high-pass filter with a cut-off frequency determined by at least one of: the first reactance, or and the first resistance. The first passive circuit may be operable as a high-pass filter with a first cut-off frequency determined by at least one of: the first reactance, or the first resistance, and the second passive circuit is operable as another high-pass filter with a second cut-off frequency determined by at least one of: the second reactance and the second resistance. The first and second cut-off frequencies may be different.

The first differential pair of transistors and the second differential pair of transistors may be operable to jointly generate the output signal of the differential amplifier. A ratio of a magnitude of the output signal over a magnitude of the input signal may be determined by an aspect ratio of a size of a constituent transistor from the second differential pair of transistors to a size of a constituent transistor from the first differential pair of transistors. A source terminal of the first transistor and a source terminal of the third transistor may be shorted together, and wherein a source terminal of the second transistor and a source terminal of the fourth transistor may be shorted together.

The equalizer circuit may further include a connecting resistor that connects the source terminals of the first transistor and the third transistor to the source terminals of the second transistor and the fourth transistor. The connecting resistor may be adjustable. The equalizer circuit may further include a connecting capacitor arranged in parallel with respect to the connecting resistor, the connecting capacitor connects the source terminals of the first transistor and the third transistor to the source terminals of the second transistor and the fourth transistor. The connecting capacitor may be adjustable.

The source terminals of the transistors in the first differential pair may be shorted together. The source terminals of the transistors in the second differential pair may be shorted together.

The passive equalizer section may further include: a third passive circuit arranged in parallel with respect to the first passive circuit and the second passive circuit, the third passive circuit coupled to the at least one input node, the third passive circuit comprising a fifth resistor, characterized by a third resistance, and a fifth reactive component, characterized by a third reactance, wherein the fifth reactive component is coupled to the fifth resistor at a fifth connection node, and wherein the third passive circuit is disposed between the input of the wireline receiver and a third common node.

The signal mixing section may further include a plurality of transistors to mix signals with different frequency response characteristics, the plurality of transistors including: a first transistor having a first gate coupled to the first passive circuit at the first connection node; a second transistor having a second gate coupled to the second passive circuit at the second connection node; and a third transistor having a third gate coupled to the third passive circuit at the fifth connection node.

The first common node, the second common node, and the third common node may be connected.

In another aspect, some implementations provide an equalizer circuit, comprising: a passive equalizer section configured to filter an input signal, the passive equalizer including: a first passive filter that comprises: a first resistor characterized by a first resistance, and a first reactive component characterized by a first reactance, wherein the first resistor and the first reactive component are in series and connected at a first connection node; and a second passive filter that comprises: a second resistor characterized by a second resistance, and a second reactive component characterized by a second reactance, wherein the second resistor and the second reactive component are in series and connected at a second connection node; and a signal mixing section comprising a plurality of transistors to mix signals with different frequency response characteristics.

The passive equalizer circuit may receive a fully-differential signal and the signal mixing section may generate a fully-differential signal.

The details of one or more embodiments are set forth in the accompanying drawings and the description below. Other aspects, features, and advantages will become apparent from the description, the drawings, and the claims.

DESCRIPTION OF DRAWINGS

Like reference symbols in the various drawings indicate like elements.

DETAILED DESCRIPTION

The past decades have witnessed surging demands for high-speed wireline communication. While the increase of communication speed is an apparent impetus behind the surging demands, other salient features such as the flexibility of the wireline communication devices are becoming increasingly prevalent in next-generation devices. In many circumstances, transmitters and receivers that are adaptable in a variety of situations are becoming increasingly desirable. The applications of high-speed wireline communication include short-range communications such as memory links for mobile devices, medium range transmissions such as Ethernet links or Internet of Things (IoT) networks, and long range transmissions such as cable TV and Internet links.

High-speed wireline link system can employ specialized Input/Output (I/O) circuitry that performs incident wave signaling over channels with controlled-impedance to achieve high data rates. In these systems, the channel's frequency-dependent dispersion characteristics and impedance discontinuities can hinder data rate scaling.

Various implementations mitigate the Inter-Symbol Interference (ISI) caused by frequency dependent channel losses between a transmitter (used interchangeably with TX) device and a receiver (used interchangeably with RX) device on a high-speed wireline link device. The implementations utilize on-chip equalizers to equalize the overall gain of different frequency components of the input signal in the entire data transmission path for data signal transition. By incorporating a passive linear equalizer and an active linear equalizer to the RX device, the RX device can amplify the high frequency components of the received signal while attenuating the low frequency components of the received signal to equalize the high frequency signal attenuation on the transition channel.

More particularly, an RX device can include a passive linear equalizer, an active linear equalizer and an AC-coupling network. The passive linear equalizer may be combined with the AC-coupling network, as well as the first stage of the active linear equalizer. Each one of the input transistors of the active linear equalizer may be divided into a pair of transistors. The parasitic capacitors may be present at the input nodes. Additionally, the input transistors of the active linear equalizer may be split to more than two pairs of transistors, to achieve variable gain factors on the receiver device. The transfer function of the passive linear equalizer can be adjusted by varying the resistor resistance, the capacitor capacitance, or both, in the AC-coupling network.

Figure 1:
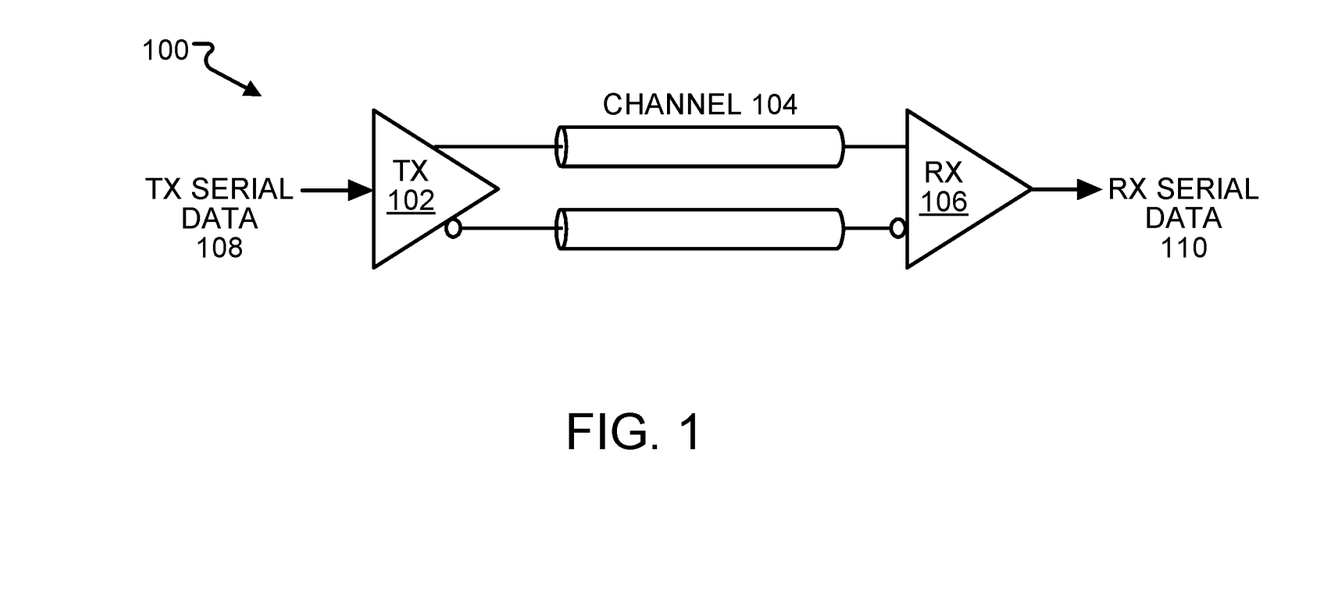
FIG. 1 shows an example of a high-speed wireline link device.

FIG. 1 shows an example of a high-speed wireline link system 100. The high-speed wireline link system 100 includes a transmitter 102, a channel 104, and a receiver 106. In this example, the transmitter 102 may receive and process serial data 108. The transmitter 102 is connected to one end of the channel 104 and provides the processed serial data signal to the channel 104. In some examples, due to the limited number of high-speed I/O pins in chip packages and printed circuit board (PCB) wiring constraints, the transmitter 102 with high-bandwidth may serialize input data in parallel form for transmission. The transmitter 102 may generate a voltage swing on the channel 104 while also maintaining a consistent output impedance in order to attenuate channel-induced reflections. The channel 104 can be a differential channel.

The receiver 106 is connected to the other end of the channel 104 and receives a transmitted signal data from the channel 104. The receiver 106 processes the data and outputs RX serial data 110. In the example of serialized data, RX serial data 110 may be sampled and de-serialized. In this illustration, the receiver 106 may compare the incoming data signal to a threshold and amplify the incoming signal to generate a digital bitstream, for example with complementary metal-oxide-semiconductor (CMOS) levels.

In this illustration, the transmitter 102 and the receiver 106 are located on two different integrated circuits (ICs). The channel 104 is a medium, in which the serial electrical signal travels from the transmitter 102 to the receiver 106. The channel 104 accommodates propagation of a complementary signal. In this example, the channel 104 can be a cable, a stripe line or a micro strip over a PCB, or a combination of these.

In this example, the communication bandwidth of the channel 104 is limited by a number of factors, including, for example, high-frequency loss of electrical traces, reflections caused from impedance discontinuities, and signal crosstalk in the channel 104. The frequency dependent loss terms result in low-pass channels where the attenuation increases with the distance. The high-frequency content of an input signal sent across such channel is filtered out, giving rise to an output signal whose energy has been spread or dispersed over several bit periods. In this example, the channel 104 may exhibit minor attenuation in DC and low-frequency regions relative to high-frequency regions for signal transmission, which causes that the common-mode voltage of the transmitter 102 and the receiver 106 to be almost the same. The DC coupling between the transmitter 102 and the receiver 106 can complicate the device design. Decoupling the common-mode voltages of the transmitter 102 from that of the receiver 106 may allow a judiciously chosen common-mode voltage to be used for each circuit. More discussions on the demarcation between low frequency and high frequency regions as well as the judicious choice for the common voltage are provided below.

Some implementations may isolate the common-mode voltages of the transmitter 102 and receiver 106 by using AC-coupling capacitors placed in the transmitter 102 or the receiver 106, and in series with the channel 104 to act as a high-pass filter. The AC-coupling capacitors are used to block the DC component of an AC waveform so that the circuit downstream can operate in the absence of the DC component. However, such AC-coupled links can be susceptible to a phenomenon known as baseline wander, in which the AC-coupling network filters out some of the signal energy that is below the cut-off frequency of the AC-coupling network. In this example, the high-pass filtering characteristic of the AC-coupling network causes the middle of the data eye to wander with low frequency components in the Non-Return-to-Zero (NRZ) data stream. This phenomena causes the received data eye height and eye width to reduce or become totally closed.

To mitigate baseline wander, the value of the AC-coupling capacitors may be increased to reduce the cutoff frequency of the AC-coupling network. In some examples, a 100-nF capacitor may be used in the peripheral component interconnect (PCI) express standard. An example of such a capacitor, placed in series with a channel that has a characteristic impedance of 50Ω, could result in a time-constant of 10 μs, or a high-pass cutoff frequency of about 16 kHz.

When the AC-coupling capacitors are placed on a PCB, vias may be introduced when connecting the AC-coupling capacitors placed on the PCB board to the data transmission lines, which are normally realized as differential strip line. These vias cause unwanted impedance discontinuities, which degrade the signal integrity by introducing dispersion and reflections. To reduce ISI due to impedance discontinuity caused by vias, the receiver 106 may incorporate a decision feedback equalizer (DFE) with multiple taps, which increases the overall power consumption and device area of the receiver 106. Some implementations may address the issues regarding the on-board AC-coupling capacitors by putting the AC-coupling capacitors in the receiver 106. These implementations may reduce the component cost and board area. Furthermore, large computing/networking systems with multiple I/Os can benefit from the absence of on-board capacitors.

Figure 2:
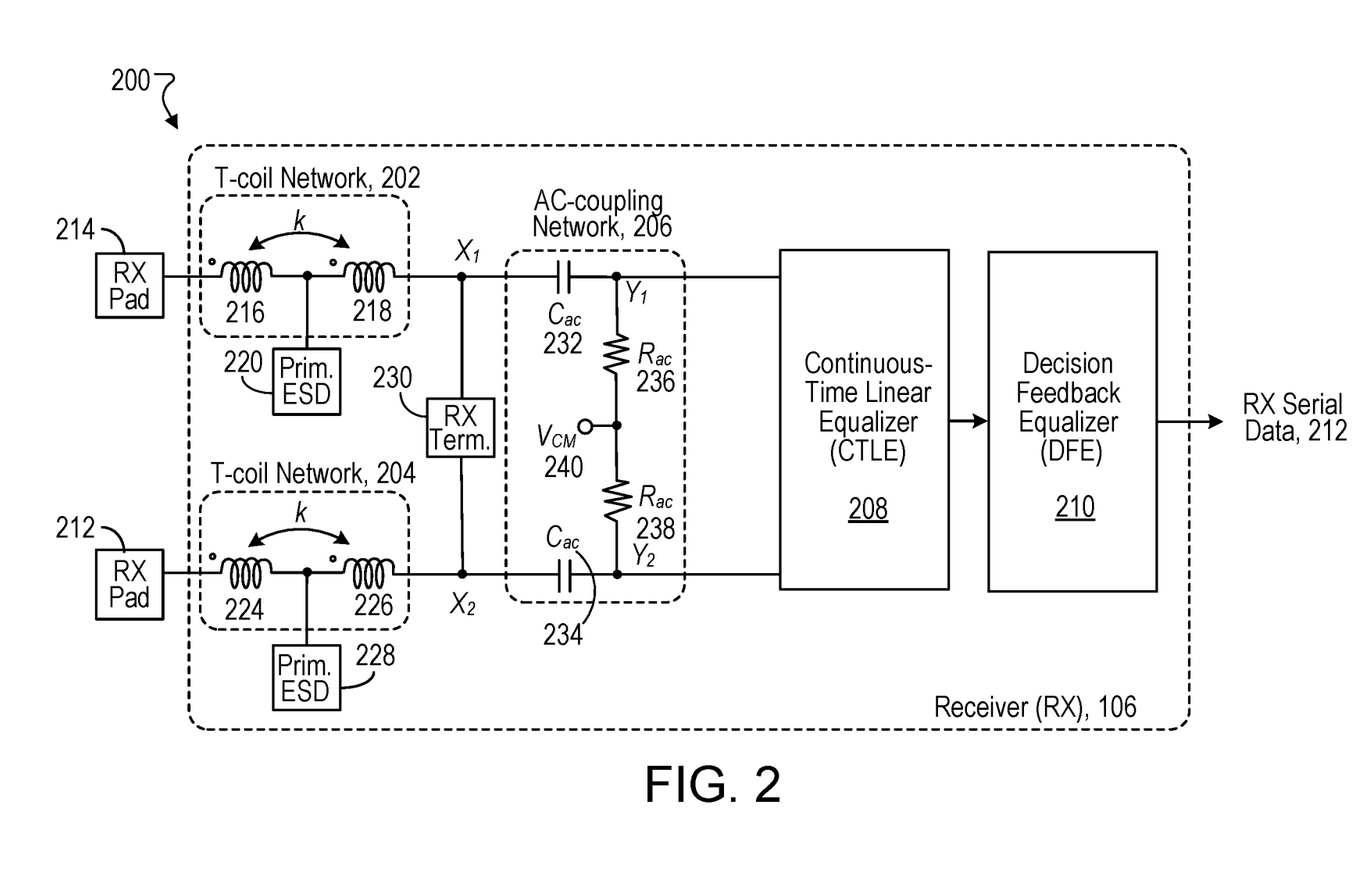
FIG. 2 shows an example of a wireline receiver device.

FIG. 2 shows an example of a wireline receiver device 200 that incorporates an on-chip AC-coupling network 206. The receiver 106 includes a pair of T-coil networks 202 and 204, an AC-coupling network 206, a continuous time linear equalizer (CTLE) 208, and a decision feedback equalizer (DFE) 210. The receiver 106 can be a wireline device. In this example, the electrical signals are transmitted from the channel 104 to the receiver 106 through the RX pads 214 and 212. As illustrated, the channel 104 can be a differential channel. For example, the RX pad 214 can be coupled to the (+) signal wire of the channel 104 and the RX pad 212 can be coupled to the (−) signal wire of the channel 104. The processed electrical signals are output from the receiver 106 as serial data to the downstream circuits.

In the receiver 106, the serial data 108 first propagates through the T-coil network 202 and T-coil network 204. The T-coil network 202 includes two mutual inductors 216 and 218 connected in series between the RX pad 214 and a node $X_1$. Similarly, the T-coil network 204 includes two inductors 224 and 226 connected in series between the RX pad 212 and a node $X_2$. In both T-coil networks, the inductors can be configured for improving impedance matching and reducing the input return-loss. In addition, the T-coil network 202 is coupled with an electrostatic discharge (ESD) protection circuit 220. The ESD protection circuit 220 is physically located between the inductor 216 and inductor 218. The T-coil network 204 is likewise coupled to ESD protection circuit 228, which is located between inductors 224 and 226. A resistive termination network (RX termination) 230 is connected to T-coil network 202 and T-coil network 204, and coupled between the nodes $X_1$ and $X_2$ to match the input impedance of the receiver 106 with the characteristic impedance of the channel 104.

In this example, the AC-coupling network 206 couples to the RX termination 230 at the two nodes $X_1$ and $X_2$. The AC-coupling network 206 includes two RC network arms arranged in series and connected at a common node $V_{CM}$ 240. The first RC network arm includes a capacitor $C_{ac}$ 232 and a resistor $R_{ac}$ 236. The capacitor $C_{ac}$ 232 is connected to the first node $X_1$, and connects to the resistor $R_{ac}$ 236 at a connection node $Y_1$. The configuration of the second RC network arm is similar to that of the first RC network arm, and includes a capacitor $C_{ac}$ 234 and a resistor $R_{ac}$ 238. The capacitor $C_{ac}$ 234 is connected to the second node $X_2$, and connects to the resistor $R_{ac}$ 238 at a connection node $Y_2$. The combination of $C_{ac}$ and $R_{ac}$ in the RC network arms generates a high-pass filter with a high-pass cut-off frequency of $f_{HP}$. In this example, the high-pass cut-off frequency may be given by:

$$f_{HP} = \frac{1}{2\pi R_{ac} C_{ac}} \quad (1)$$

In some examples, the value of the largest capacitors that can be configured on the receiver 106 is usually limited to a few picofarad (pF). For example, if the receiver 106 is designed to have $C_{ac}$=4 pF and $f_{HP}$=50 kHz, the value of $R_{ac}$ in the AC-coupling network 206 may equal to 800 kΩ.

The receiver 106 includes the CTLE 208 that receives input signal data from the AC-coupling network 206 and may send processed data signal to the DFE 210. In this example, the CTLE 208 may be part of the front-end of the receiver 106. In some examples, the CTLE 208 may compensate for some of the high-frequency channel loss.

The receiver 106 may also include a DFE 210 that receives input signal data from CTLE 208 and generates the processed serial data 110 as output of receiver 106. In a high-speed wireline communication system, due to the skin effect and dielectric losses, the channels often introduce large inter-symbol interference (ISI) that can lead to errors in receiving digital bits in the receiver side. To deal with the ISI, an equalization circuit such as, for example, decision-feedback equalizers (DFE) can be adopted to restore the transmitted data signals on the receiver side to reduce the Bit Error Rate (BER) below a targeted level. In this example, the DFE 210 may learn from previously recovered data signals to adaptively estimate a distortion on the current data signal, and then subtract the estimated distortion value from the received data signal. For example, in 40 Gb/s to 100 Gb/s links, the DFE 210 may reduce the post-cursor ISI for channels with a long impulse response tail. In some other examples, the receiver 106 is sensitive to input noise and crosstalk, and may include a higher complexity DFE circuits, in order to more extensively compensate for the total channel loss. The DFE 210 may use quantized input values to control the polarity of the equalization taps to reduce the noise build-up in the receiver 106.

Figure 3:
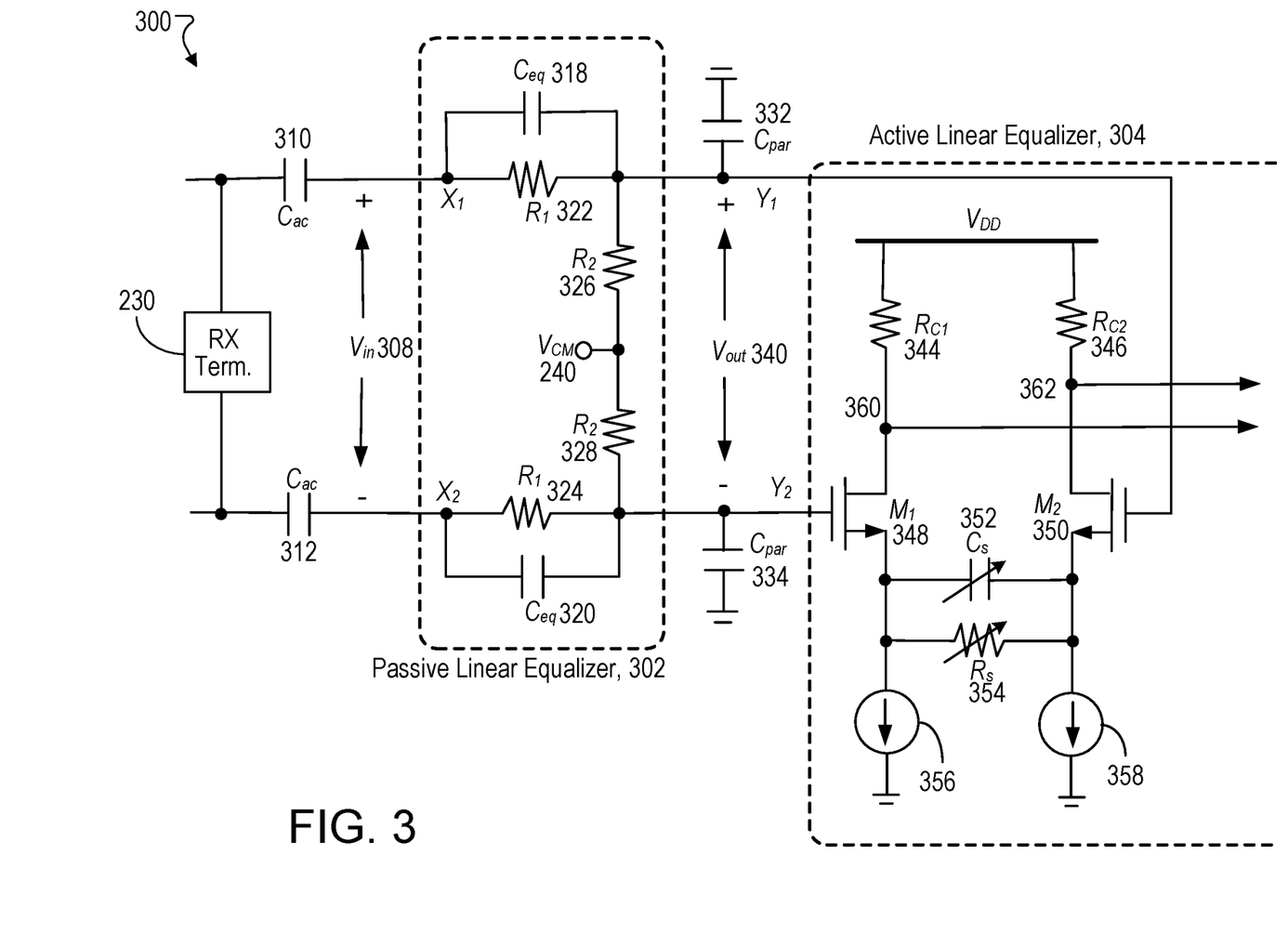
FIG. 3 shows an example of a wireline receiver device with a passive linear equalizer.

FIG. 3 shows an example of a wireline receiver device 300 with a passive linear equalizer 302. For brevity, this example of wireline receiver device 300 does not include T-coil network and ESD protections circuits, as illustrated in FIG. 2. However, other examples may include T-coil networks and ESD protection circuits. The wireline receiver device 300 includes a RX termination network 230, a pair of capacitors $C_{ac}$ 310 and $C_{ac}$ 312, a passive linear equalizer 302, a pair of parasitic capacitors $C_{par}$ 332 and $C_{par}$ 334, and an active linear equalizer 304. The parasitic capacitors $C_{par}$ 332 and $C_{par}$ 334 are due to unwanted metal routing capacitors and parasitic capacitors due to secondary ESD circuits.

In the wireline receiver device 300, the capacitors $C_{ac}$ 310 and $C_{ac}$ 312 connect the RX termination network 230 to the passive linear equalizer 302. Further referring to FIG. 2, an input signal may arrive at RX pads 212 and 214, and then pass through T-coil network 204 and 202 to reach the RX termination network 230. Thereafter, the input signal passes through the capacitors $C_{ac}$ 310 and $C_{ac}$ 312 which block DC and low-frequency components of the input signal, but pass the mid- and high-frequency components.

As illustrated in FIG. 3, the DC-blocked signal $V_{in}$ 308 is first filtered through the passive linear equalizer 302 and then transferred to the active linear equalizer 304. In this example, the passive linear equalizer 302 includes a RC network with two arms. A first arm of the RC network includes a capacitor $C_{eq}$ 318, a resistor $R_1$ 322, and a resistor $R_2$ 326. The capacitor $C_{eq}$ 318 and the resistor $R_2$ 326 are connected in series at the connection node $Y_1$. The first arm of the RC network also includes the resistor $R_1$ 322 arranged in parallel with the capacitor $C_{eq}$ 318 between the connection nodes $X_1$ and $Y_1$. A second arm of the RC network likewise includes a capacitor $C_{eq}$ 320, a resistor $R_1$ 324, and a resistor $R_2$ 328. The capacitor $C_{eq}$ 320 and the resistor $R_2$ 328 are connected in series at the connection node $Y_2$. The second arm of the RC network also includes the resistor $R_1$ 324 arranged in parallel with the capacitor $C_{eq}$ 320 between the connection nodes $X_2$ and $Y_2$. The first and second RC network arms are connected at a common node $V_{CM}$ 240. The passive linear equalizer 302 generates an output voltage $V_{out}$ 340 between the connection nodes $Y_1$ and $Y_2$. The output voltage $V_{out}$ 340 drives active linear equalizer 304.

The one illustrative example, the capacitance of capacitors $C_{eq}$ 318 and $C_{eq}$ 320 can be much smaller than, for example less than 10%, that of capacitors $C_{ac}$ 310 and $C_{ac}$ 312 for attaining the desired function of the passive linear equalizer 302. In this example, the combination of the capacitor $C_{eq}$ 318 and resistors $R_1$ 322 and $R_2$ 326, along with the combination of the capacitor $C_{eq}$ 320 and resistors $R_1$ 324 and $R_2$ 328, create a high-pass filter with a cut-off corner frequency. The approximate value of the high-pass cut-off frequency of the AC-coupling network 206 is given by:

$$f_{HP} = \frac{1}{2\pi C_{ac}(R_1 + R_2)} \quad (2)$$

In various configurations, the value of the high-pass cut-off frequency can be limited to be less than 100 kHz, to mitigate the DC baseline wander. In these configurations, if the receiver 106 includes a $C_{ac}$ at 4 pF, the added resistance of $R_1$ and $R_2$ may equal to 400 kΩ.

The transfer function of the passive linear equalizer 302 shown in FIG. 3 is given by:

$$H_{EQ}(s) = \frac{V_{out}}{V_{in}}(s) = \frac{R_2}{R_1 + R_2} \frac{1 + R_1 C_{eq} s}{1 + (R_1 \parallel R_2) C_{eq} s} \quad (3)$$

Here, the gain of the passive linear equalizer 302 at mid-frequency, for example, a frequency that is ten times higher than the high-pass cut-off frequency $f_{HP}$, can depend on $R_2/(R_1+R_2)$. At very high frequencies, the gain of the passive linear equalizer 302 is close to 0 dB. Based on the transfer function $H_{EQ}(s)$, the resistor values of $R_1$ and $R_2$ may be adjusted to, for example, 200 kΩ, to provide a boost gain value of 6 dB for the passive linear equalizer 302, where the boost gain of an equalizer is defined as the high-frequency gain divided by the low-frequency gain of that equalizer. The capacitance value of the capacitor $C_{eq}$ may be 1.6 femto Farad (fF) for a zero gain of the passive linear equalizer 302 at frequency of 500 MHz. However, such capacitance value of the capacitor $C_{eq}$ may become smaller than a threshold value for practical implementation.

In addition, as shown on FIG. 3, the parasitic capacitors $C_{par}$ 332 and $C_{par}$ 334 refer to the combined effect of all unwanted capacitances located at nodes $Y_1$ and $Y_2$, which may include the unwanted parasitic capacitances of the right terminals of capacitors $C_{eq}$ 318 and 320, the respective metal routing capacitances at nodes $Y_1$ and $Y_2$, and the respective gate capacitances of transistor $M_1$ 348 and $M_2$ 350 in the active linear equalizer 304, and capacitances due to secondary ESD circuits. In some example, the parasitic capacitance can be on the order of 200 fF. Taking the parasitic capacitor $C_{par}$ into account, the transfer function of the passive linear equalizer 302 becomes:

$$H_{EQ}(s) = \frac{V_{out}}{V_{in}}(s) = \frac{R_2}{R_1 + R_2} \frac{1 + R_1 C_{eq} s}{1 + (R_1 \parallel R_2)(C_{par} + C_{eq}) s} \quad (4)$$

According to equation (2), when the parasitic capacitor $C_{par}$ increases due to, for example, manufacturing constraints, the pole of above transfer function of the passive linear equalizer 302 may be shifted to a lower frequency, which means that the passive linear equalizer ceases to perform the desirable functions as an equalizer. The passive linear equalizer 302 is usually incorporated into the receiver 106 device when an AC-coupling network is not provided between the channel 104 and the CTLE 208.

The active linear equalizer 304 receives the output voltage $V_{out}$ 340 from the passive linear equalizer 302. The active linear equalizer can be a differential amplifier. The active linear equalizer 304 generates an output data signal going out from nodes 360 and 362. The active linear equalizer 304 includes a transistor $M_1$ 348 and a transistor $M_2$ 350 matched to $M_1$ 348. During the fabrication of integrated devices on wafers, each device undergoes slightly different fabrication process. In addition, different wafers experience different fabrication processes. For illustration, for two resistors with 1-kΩ resistance on a single integrated circuit, the value of these two resistors could increase or decrease because of variations in the fabrication process. The scale of increase or decrease could also vary. But if the two resistors have the same width and the same length and are fabricated beside each other on the wafer, the two resistors experience almost the same amount of process variation, and as such the resistance values scale up or down by almost the same factor. These two resistors are then called matched resistors. Matched devices do not necessary have the same values, but matched devices are made of unit cells with the same geometries and are placed close to each other and with the same orientation. For example, a current source with 2 μA of current could be matched with a current source with 10 μA of current. In this illustration, if the current of the first current source increases by 10%, the current of the second current source increases by almost the same percentage. The transistor $M_1$ 348 includes a gate connected to the connection node $Y_2$ in the second RC network arm. The transistor $M_2$ 350 includes a gate connected to the connection node $Y_1$ in the first RC network arm. In this example, the active linear equalizer 304 also includes resisters $R_{C1}$ 344 and $R_{C2}$ 346 respectively connected to the drain terminals of the transistor $M_1$ 348 and transistor $M_2$ 350. The active linear equalizer 304 also includes a current source 356 and a current source 358 respectively connected to the source terminals of the transistor $M_1$ 348 and transistor $M_2$ 350. The other terminals of the current source 356 and the current source 358 are connected to the ground. Adjustable capacitor 352 and adjustable resistor 354 span between the source terminals of the transistor $M_1$ 348 and transistor $M_2$ 350.

Figure 4:
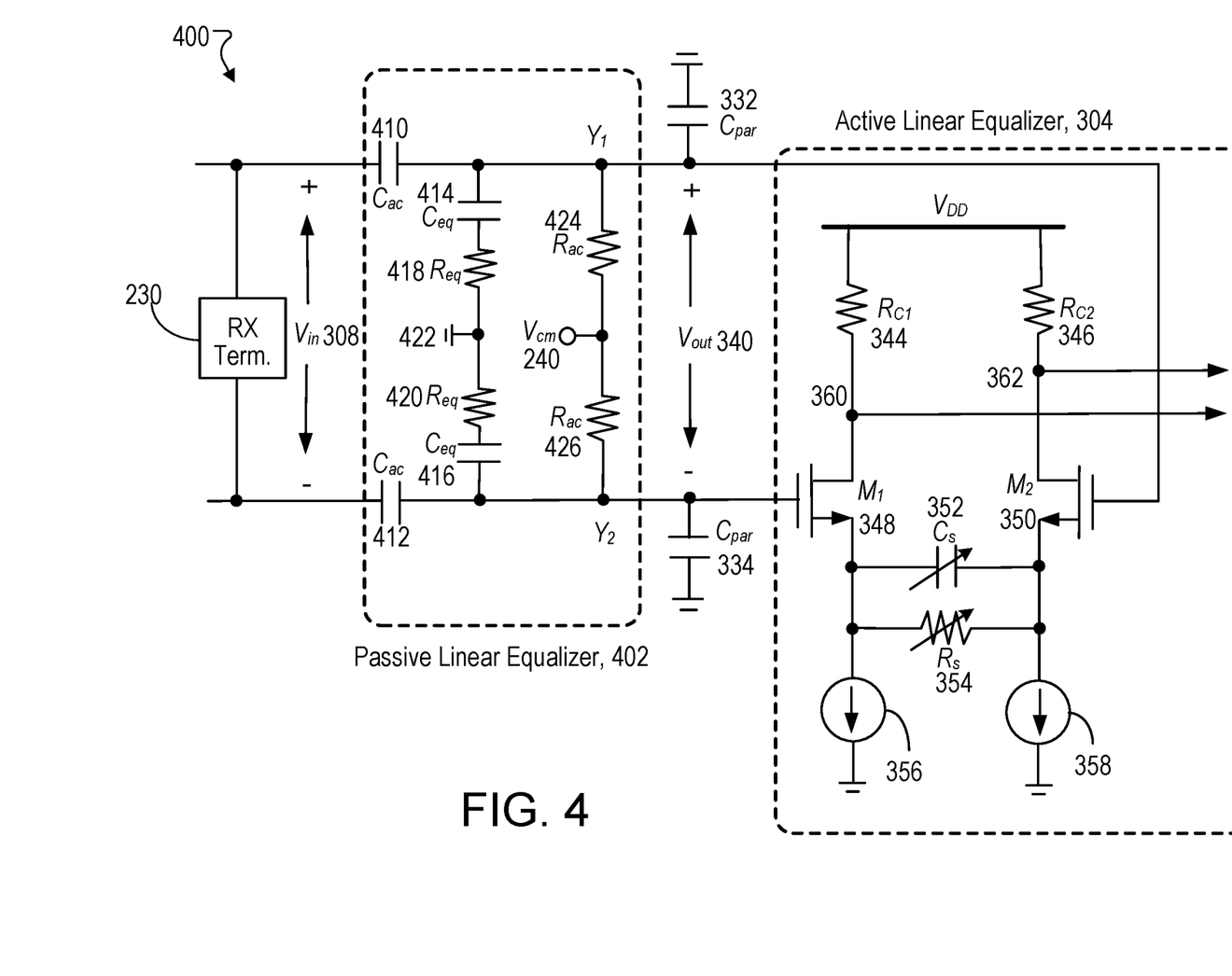
FIG. 4 shows an example of a wireline receiver device with a passive linear equalizer combined with AC-coupling capacitors.

Further referring to FIG. 4, an example of a wireline receiver device 400 can include a passive linear equalizer 402 combined with AC-coupling capacitors. In this example, the wireline receiver 400 includes a RX termination network 230, a passive linear equalizer 402, and an active linear equalizer 304. Similarly labelled components are similar to those from wireline receiver device 300, except when expressly noted.

For context, an equalizer may not perform amplification. While performing equalization, however, the equalizer may attenuate the low- and mid-frequency components of the signal. For a passive linear equalizer, it may be advantageous, if the high-frequency gain is 0 dB, which means the passive equalizer is not attenuating the high-frequency components of the signal. The passive linear equalizer 402 includes two RC networks. The first RC network includes a first arm and a second arm arranged in parallel fashion. The first arm of the first RC network includes a capacitor $C_{ac}$ 410 and a resistor $R_{ac}$ 424 connected in series at the connection nodes $Y_1$. The second arm of the first RC network likewise includes a capacitor $C_{ac}$ 412 and a resistor $R_{ac}$ 426 connected in series at the connection nodes $Y_2$. The resistors $R_{ac}$ 424 and $R_{ac}$ 426 are connected at the common-mode voltage $V_{CM}$ 240. In this example, the capacitors $C_{ac}$ 410 and $C_{ac}$ 412 (for AC-coupling) block the DC and low-frequency components of the signal $V_{in}$ 308 from reaching to the active linear equalizer 304. Referring to FIG. 2, the input voltage may initially arrive at RX pads 212 and 214, and then pass through T-coil network 204 and 202 to reach RX termination network 230. In this example of passive linear equalizer 402, the second RC network includes a first arm and a second arm. The first arm of the second RC network includes a capacitor $C_{eq}$ 414 and a resistor $R_{eq}$ 418 connected in series. The second arm of the second RC network likewise includes a capacitor $C_{eq}$ 416 and a resistor $R_{eq}$ 420 connected in series. The first arm with the resistor $R_{eq}$ 418 and capacitor $C_{eq}$ 414 is connected between connection node Y1 and ground 422 (or other common node), whereas the second arm with the resistor $R_{eq}$ 420 are the capacitor $C_{eq}$ 416 is connected between the connecting node $Y_2$ and ground 422.

In this example, the resistance of resistor $R_{eq}$ can be much smaller than (e.g., less than 10%) that of the resistor $R_{ac}$ for the AC-couple network and the passive linear equalizer to perform the desired functions of high-pass filtering. The cut-off frequency $f_{HP}$ of the AC-coupling network can be obtained from:

$$f_{HP} = \frac{1}{2\pi R_{ac}(C_{ac} + C_{eq})} \tag{5}$$

For input signals with frequencies much higher than the cut-off frequency $f_{HP}$, the transfer function of the passive linear equalizer 402, as shown in FIG. 4, can be obtained from:

$$H_{EQ}(s) = \frac{V_{out}}{V_{in}}(s) = \frac{C_{ac}}{C_{ac} + C_{eq}} \frac{1 + R_{eq}C_{eq}s}{1 + R_{eq}\left(\frac{C_{ac}C_{eq}}{C_{ac} + C_{eq}}\right)s} \tag{6}$$

Here, the mid-frequency gain of the passive linear equalizer 402 can be characterized as $C_{ac}/(C_{ac}+C_{eq})$. In an example where the total capacitance of the passive linear equalizer is around 4 pF, the capacitances of both $C_{ac}$ and $C_{eq}$ can be 2 pF and the resistance of $R_{ac}$ can be 400 kΩ, in order to achieve a cut-off frequency $f_{HP}$ of about 100 kHz and a boost gain of about 6 dB. In some examples, the resistance of resistor $R_{eq}$ can be 160Ω in order to achieve a zero in the transfer function at 500 MHz. Creating an on-chip resistor with a value of 160Ω should not represent a manufacturing hurdle. As such, the passive linear equalizer 402 can be combined with an AC-coupling network in various configurations with ease. However, the parasitic capacitors $C_{par}$ 332 at connection nodes $Y_1$ and the parasitic capacitor $C_{par}$ 334 at connection nodes $Y_2$ can degrade the high-frequency gain of the passive linear equalizer 402. The high-frequency gain $A_{HF}$ of the passive linear equalizer 402, taking the patristic capacitor $C_{par}$ into account, equals to $C_{ac}/(C_{ac}+C_{par})$. For example, if the capacitor $C_{ac}$ equals to 2 pF and parasitic capacitor $C_{par}$ equals to 0.2 pF, the gain of the passive linear equalizer 402 at high frequency becomes around 0.9 (or −0.83 dB). This level of attenuation at high frequency can degrade the performance of the receiver 106 device. Some implementations discussed below can keep the amount of attenuation at high frequency at bay.

Figure 5:
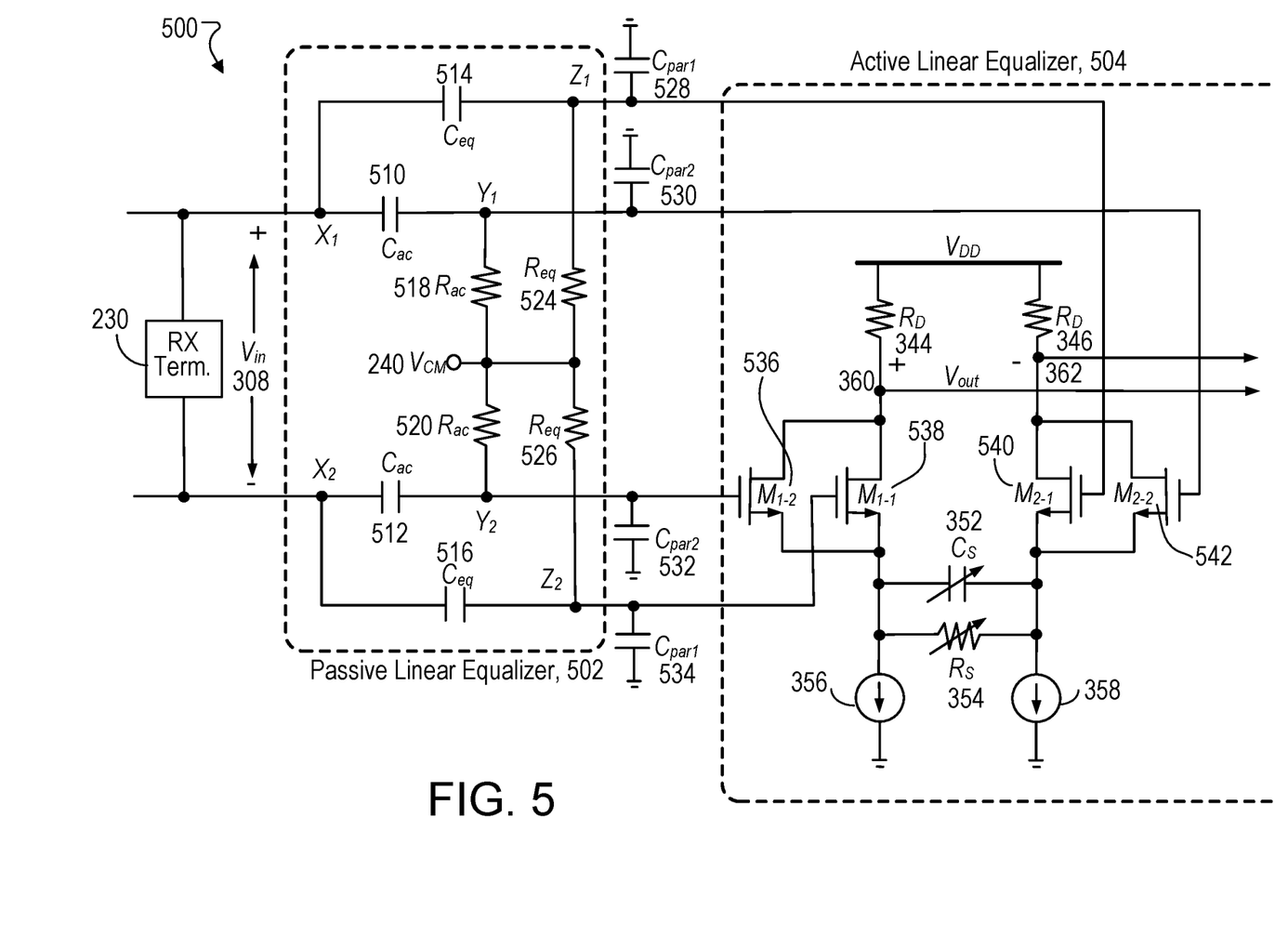
FIG. 5 shows an example of a wireline receiver device with a passive linear equalizer combined with AC-coupling network and the first stage of the active linear equalizer.

A passive linear equalizer can be combined with an AC-coupling network as well as the first stage of the active linear equalizer. FIG. 5 shows an example of a wireline receiver 500 with a passive linear equalizer 502 combined with AC-coupling network and the first stage of the active linear equalizer 504. In this example, the wireline receiver 500 includes a RX termination network 230, a passive linear equalizer 502, parasitic capacitors (for example, illustrated as $C_{par}$ 528, $C_{par}$ 530, $C_{par}$ 532, and $C_{par}$ 334), and an active linear equalizer 504. Similarly labelled components are similar to those from wireline receiver 400 and wireline receiver 300, except when explicitly noted. While these illustrated examples from FIGS. 2-4 show a pair of inputs, the present disclosure is equally applicable to implementations using single-ended inputs. Active linear equalizer 504 can be a differential amplifier.

As depicted in FIG. 5, the passive linear equalizer 502 includes two RC networks. The first RC network is coupled to the two terminal nodes of the RX termination network 230. A first arm of the first RC network includes AC-coupling capacitor $C_{ac}$ 510 and resistor $R_{ac}$ 518 connected in series at the connection node $Y_1$. The AC-coupling capacitor $C_{ac}$ 510 is connected to the RX termination network 230 at connection node $X_1$. Likewise, a second arm of the first RC network includes AC-coupling capacitor $C_{ac}$ 512 and resistor $R_{ac}$ 520 connected in series at the connection node $Y_2$. The AC-coupling capacitor $C_{ac}$ 512 is connected to the RX termination at connection node $X_2$. The first arm and the second arm of the first RC network are arranged in series and connected at common-mode voltage node $V_{CM}$ 240.

In this example, the passive linear equalizer 502 includes a second RC network arranged in parallel with respect to the first RC network and coupled to the two terminal nodes of the RX termination network 230. A first arm of the second RC network includes an equalizer capacitor $C_{eq}$ 514 and an equalizer resistor $R_{eq}$ 524 connected in series at a connection node $Z_1$. The equalizer capacitor $C_{eq}$ 514 is connected to the terminal of the RX termination at connection node $X_1$. Similarly, a second arm of the second RC network includes an equalizer capacitor $C_{eq}$ 516 and resistor $R_{eq}$ 526 connected in series at the connection node $Z_2$. The equalizer capacitor $C_{eq}$ 516 is connected to the terminal of the RX termination at connection node $X_2$. The first arm and the second arm of the second RC network are arranged in series and connected at common-mode voltage node $V_{CM}$ 240.

In the wireline receiver 500, the active linear equalizer 504 receives the filtered input signal from the passive linear equalizer 502 and generates an output signal at the nodes 360 and 362. In this example, the active linear equalizer 504 includes a first differential pair of transistors ($M_{1-2}$ and $M_{2-2}$) and a second differential pair of transistors ($M_{1-1}$ and $M_{2-1}$) in parallel arrangement. The first differential pair of transistors includes a transistor $M_{1-2}$ 536 which has a gate terminal connected to the second arm of the first RC network in the passive linear equalizer 502 at the connection node $Y_2$. The first differential pair of transistors also includes a transistor $M_{2-2}$ 542 which is matched to the transistor $M_{1-2}$ 536 and has a gate terminal connected to the first arm of the first RC network in the passive linear equalizer 502 at the connection node $Y_1$. Likewise, the second differential pair of transistors includes a transistor $M_{1-1}$ 538 which has a gate terminal connected to the second arm of the second RC network in the passive linear equalizer 502 at the connection node $Z_2$. The second differential pair of transistors also includes a transistor $M_{2-1}$ 540 which is matched to the transistor $M_{1-1}$ 538 and has a gate terminal connected to the first arm of the second RC network in the passive linear equalizer 502 at the connection node $Z_1$.

Parasitic capacitors are present at nodes $Y_1, Y_2, Z_1$ and $Z_2$. As illustrated in more detail in FIG. 5, the parasitic capacitor $C_{par1}$ 528 represents all the parasitic capacitance existing at the connection node $Z_1$. The parasitic capacitor $C_{par2}$ 530 represents all the parasitic capacitance existing at the connection node $Y_1$. Similarly, the parasitic capacitor $C_{par1}$ 534 represents all the parasitic capacitance existing at the connection node $Z_2$. The parasitic capacitor $C_{par2}$ 532 represents all the parasitic capacitance existing at the connection node $Y_2$.

Comparing and contrasting active linear equalizer 304 with active linear equalizer 504, each of the input transistors of the active linear equalizer 304 of FIG. 3 is split into two transistors in active linear equalizer 504 of FIG. 5. For example, transistor $M_1$ 348 is divided into transistor $M_{1-1}$ 538 and transistor $M_{1-2}$ 536; and transistor $M_2$ 350 is divided into transistor $M_{2-1}$ 540 and transistor $M_{2-2}$ 542. Assuming the capacitance of capacitor $C_s$ is zero, the transfer function of $V_{out}$ (s)/$V_{in}$ (s) is given by:

$$\frac{V_{out}}{V_{in}}(s) = \left( \frac{R_{ac}C_{ac}s}{1+R_{ac}C_{ac}s}g_{m2} + \frac{R_{eq}C_{eq}s}{1+R_{eq}C_{eq}s}g_{m1} \right) \frac{R_D}{1+(g_{m1}+g_{m2})(R_S/2)} \quad (7)$$

Here, $g_{m1}$ resresents the transconductance of transistor $M_{1-1}$ and transistor $M_{2-1}$, and $g_{m2}$ respresents the transconductance of transistor $M_{1-2}$ and transistor $M_{2-2}$. In this case, the transfer function of the active stage of the equalizer before transistors $M_1$ and $M_2$ are split, would be $g_m R_D/(1+g_m R_S)$, where $g_m = g_{m1} + g_{m2}$. Therefore, the transfer function of the combination of the AC-coupling network and the passive equalizer can be obtained as:

$$H_{EQ}(s) = \frac{(g_{m2}R_{ac}C_{ac} + g_{m1}R_{eq}C_{eq} + (g_{m1}+g_{m2})R_{ac}C_{ac}R_{eq}C_{eq}s)s}{(g_{m1}+g_{m2})(1+R_{ac}C_{ac}s)(1+R_{eq}C_{eq}s)} \quad (8)$$

The time constant of the combination of resistor $R_{ac}$ and capacitor $C_{ac}$ may define a high-pass cut-off frequency of the AC-coupling network. In the illustration of FIG. 5, the cut-off frequency $f_{HP}$ of the AC-coupling network is given by:

$$f_{HP} = \frac{1}{2\pi R_{ac}C_{ac}} \quad (9)$$

In some examples, at frequencies higher than the cut-off frequency $f_{HP}$ of the AC-coupling network, but substantially below the high-pass cut-off frequency of the RC network branch $R_{eq}-C_{eq}$, the input signal may only apply to the second differential amplifier including the transistors $M_{1-2}$ 536 and $M_{2-2}$ 542; and the input transistor pair include transistor $M_{1-1}$ 538 and $M_{2-1}$ 540 may not receive the input signal. The time constant of the RC network branch $R_{eq}-C_{eq}$ can be much smaller than (for example, less than 0.1%) that of the RC network branch $R_{ac}-C_{ac}$ branch. Therefore, the RC network branch $R_{eq}-C_{eq}$ branch performs as a high-pass filter by blocking the mid-frequency components of the input signal, and only passing the high frequency components of the input signal. As a result, the high-frequency components of the input signal are applied to both differential pairs and amplified in the wireline receiver 500. Because the $R_{eq}C_{eq}$ is considerably smaller than (for example, 0.1%) that of $R_{ac}C_{ac}$, the pole and zero of $H_{EQ}(s)$ are given by:

$$f_p = \frac{1}{2\pi R_{eq} C_{eq}} \quad (10)$$

and $$f_z = \frac{g_{m2}}{g_{m1} + g_{m2}} f_p \quad (11)$$

In some examples, if the cut-off frequency $f_{HF}$ is around 100 kHz, the zero of the transfer function $f_z$ can be around 500 MHz and if the input transistors of the active stage of the active linear equalizer 504 is divided into two equal transistors, the boost gain of the passive linear equalizer may be around 6 dB,. For example, identical transistor configurations may be added to $M_{1-1}$, $M_{2-1}$, $M_{1-2}$ and $M_{2-2}$. If the capacitors $C_{ac}$ and $C_{eq}$ are both equal to 2 pF, then the resistor $R_{ac}$ may be equal to 800 kΩ and the resistor $R_{eq}$ may be equal to 80Ω.

The parasitic capacitances of $C_{par1}$ and $C_{par2}$ at the input of the active stage of the active linear equalizer 504 degrade the high-frequency gain $A_{HF}$. In the wireline receiver 500, the high-frequency gain $A_{HF}$ is larger than that of the wireline receiver device 400, because the parasitic capacitances of $C_{par1}$ and $C_{par2}$ shown in FIG. 5 are about half of the parasitic capacitances of $C_{par}$ shown on FIG. 4. For the wireline receiver 500, the high-frequency gain $A_{HF}$ is given by:

$$A_{HF} = \frac{g_{m2}}{g_{m1} + g_{m2}} \frac{C_{ac}}{C_{ac} + C_{par2}} + \frac{g_{m1}}{g_{m1} + g_{m2}} \frac{C_{eq}}{C_{eq} + C_{par2}} \quad (12)$$

In this example, the high-frequency gain $A_{HF}$ of the wireline receiver 500 equals to 0.95 or −0.42 dB, which shows less attenuation at high frequency as compared to that of wireline receiver device 400. In the wireline receiver 500, the gain value of the passive linear equalizer 502 may be fixed, but the location of zero of the passive linear equalizer 502 can be adjusted by varying the resistance of $R_{eq}$ 524 and $R_{eq}$ 526. The amount of the boost that the wireline receiver 500 can provide may depend on the aspect ratio of the input transistors in the active linear equalizer 504. In some examples, the aspect ratio of the input transistors can be configured as $M_{1-1} = M_{2-1} = 2M_{1-2} = 2M_{2-2}$, and that leads to a boost gain of about 9.5 dB. However, this type of programmable configuration may not always be feasible in the absence of more input stages being added in parallel to the receiver devices.

Figure 6:
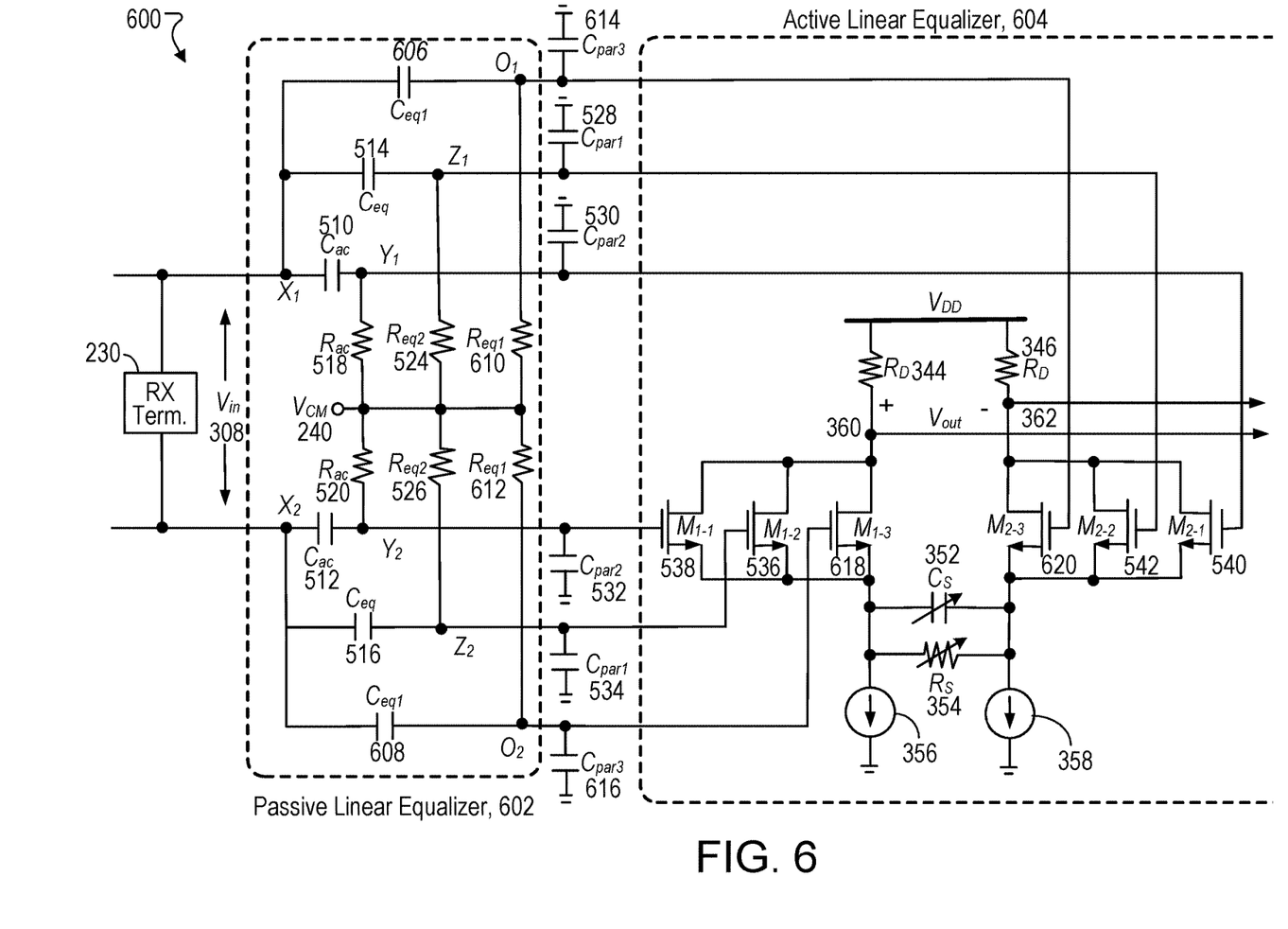
FIG. 6 shows another example of a wireline receiver device with a passive linear equalizer and the active linear equalizer with three differential amplifiers at the first stage.

FIG. 6 illustrates an example with additional programmability so that an equalizer can be programmed to equalize different channels. In more detail, FIG. 6 shows an example of a wireline receiver device 600 with a passive linear equalizer 602 and an active linear equalizer 604 with three differential amplifiers at a first stage of the active linear equalizer 604. The wireline receiver device 600 can be similar to the wireline receiver 500, except as described below. In this example, the wireline receiver device 600 includes a RX termination network 230, a passive linear equalizer 602, parasitic capacitors (e.g., as illustrated by $C_{par}$ 528, $C_{par}$ 530, $C_{par}$ 532, and $C_{par}$ 334), and an active linear equalizer 604.

In this example, the passive linear equalizer 602 includes an additional RC network compared to that of the passive linear equalizer 502. In passive linear equalizer 602, the third RC network is arranged in parallel with respect to the first and the second RC networks describes in FIG. 5, and couples to the RX termination network 230 at connection nodes $X_1$ and $X_2$. A first arm of the third RC network includes capacitor $C_{eq1}$ 606 and resistor $R_{eq1}$ 610 connected in series at the connection node $O_1$. The capacitor $C_{eq1}$ 606 is connected to the RX termination network 230 at connection node $X_1$. Similarly, a second arm of the third RC network includes capacitor $C_{eq1}$ 608 and resistor $R_{eq1}$ 612 connected in series at the connection node $O_2$. The capacitor $C_{eq1}$ 608 is connected to the RX termination network 230 at connection node $X_2$. The first arm and the second arm of the third RC network are arranged in series at common-mode voltage node $V_{CM}$ 240.

In this example, the active linear equalizer 604 includes an additional differential pair of transistors as compared to the active linear equalizer 504 of FIG. 5. The third differential pair of transistors include a transistor $M_{1-3}$ 618 which has a gate terminal connected to the second arm of the third RC network in the passive linear equalizer 602 at the connection node $O_2$. The third differential pair of transistors also include a transistor $M_{2-3}$ 620 which is matched to the transistor $M_{1-3}$ 618 and has a gate terminal connected to the first arm of the third RC network in the passive linear equalizer 602 at the connection node $O_1$.

Parasitic capacitors are present at nodes $O_1$, $O_2$, $Z_1$, $Z_2$, $Y_1$, and $Y_2$. The parasitic capacitor $C_{par1}$ 528, $C_{par2}$ 530, $C_{par1}$ 534, and $C_{par2}$ 532 have been discussed above in association with FIG. 5. The wireline receiver device 600 may include additional parasitic capacitors $C_{par3}$ 614 and $C_{par3}$ 616 in the third RC networks of the passive linear equalizer 602 and on the third differential amplifiers of the active linear equalizer 604. The parasitic capacitor $C_{par3}$ 614 is not introduced by design but may represent an unintended capacitance load connected to the first arm of the third RC network and the gate terminal of the transistor $M_{2-3}$ 620 at the connection node $O_1$. The parasitic capacitor $C_{par3}$ 616 is likewise not by design but may represent an unintended capacitance load connected to the second arm of the second RC network and the gate terminal of the transistor $M_{1-3}$ 618 at the connection node $O_2$.

In wireline receiver device 600, the input transistors of the active linear equalizer 604 have been split into more than two input pairs, in order to have more programmability in the transfer function of the passive linear equalizer. As shown in FIG. 6, three pairs of input transistors are included at the active stage of the active linear equalizer 604. In this example, at least two different boost values of the wireline receiver device 600 can be achieved, as compared with wireline receiver 500 and wireline receiver 400. Furthermore, the location of the zero of the transfer function can be adjusted by varying the resistances of $R_{eq1}$ and $R_{eq2}$.

Figure 7:
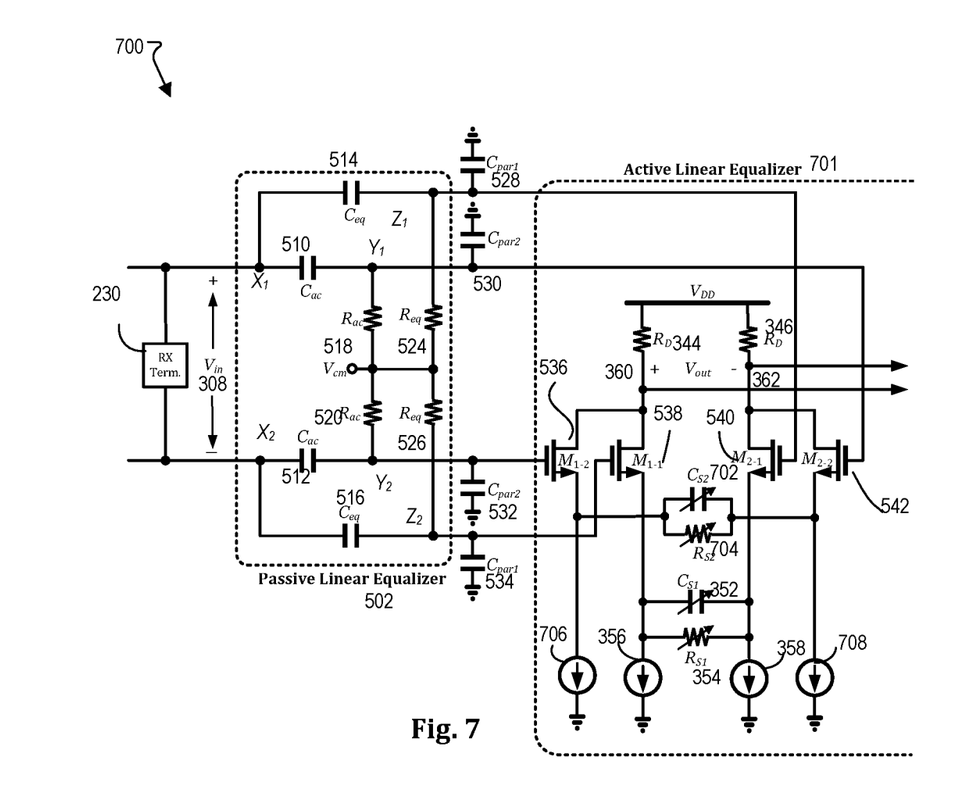
FIG. 7 shows yet another example of a wireline receiver device with a passive linear equalizer combined with AC-coupling network and the first stage of the active linear equalizer.

FIG. 7 illustrates another example with additional programmability. Wireline receiver device 700 includes passive linear equalizer 502 and active linear equalizer 701. The passive linear equalizer 502 is coupled to RX termination network 230 and includes two RC networks, as discussed above in association with FIG. 5. The parasitic capacitors (represented by $C_{par1}$ 528, $C_{par2}$ 530, $C_{par1}$ 534, and $C_{par2}$ 532) present at nodes $Y_1$, $Y_2$, $Z_1$ and $Z_2$ have also been described above in association with FIG. 5. The active linear equalizer 701 receives the filtered input signal from the passive linear equalizer 502 and generates an output signal at the nodes 360 and 362. In this example, the active linear equalizer 701 includes a first differential pair of transistors ($M_{1-2}$ and $M_{2-2}$) and a second differential pair of transistors ($M_{1-1}$ and $M_{2-1}$) with respective gate terminals arranged in the same way as discussed above in association with FIG. 5. Adjustable capacitor 352 and adjustable resistor 354 span between the source terminals of the transistor $M_{1-1}$ 538 and transistor $M_{2-1}$ 540, each source terminal respectively coupling to current source 356 and current source 358, as discussed above in association with FIG. 5. Adjustable capacitor 702 and adjustable resistor 704 span between the source terminals of the transistor $M_{1-2}$ 536 and transistor $M_{2-2}$ 542, each source terminal respectively coupling to current source 706 and current source 708.

What has been described is a method for combining passive linear equalizer on wireline receiver device on a high-speed wireline link device. Although the example of a passive linear equalizer is advantageously employed as a component to improve the attenuation at high frequency on any receiver device, the advantages of the specification are best exploited within high speed wireline link devices. Indeed, a number of implementations have been described. Nevertheless, it will be understood that various modifications can be made without departing from the spirit and scope of the subject innovation. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An equalizer circuit, comprising:
    a passive equalizer section coupled to at least one input node, the passive equalizer section configured to filter an input signal and including:
        a first passive circuit comprising a first resistor characterized by a first resistance, and a first reactive component characterized by a first reactance, wherein the first reactive component is coupled to a first node of the at least one input node, wherein the first reactive component is coupled to the first resistor at a first connection node, and wherein the first passive circuit is disposed between the first node of the at least one input node and a first branch node; and
        a second passive circuit comprising a second resistor characterized by a second resistance, and a second reactive component characterized by a second reactance, wherein the second reactive component is coupled to the first node of the at least one input node, wherein the second reactive component is coupled to the second resistor at a second connection node, wherein the second passive circuit is disposed between the first node of the at least one input node and a second branch node; and
    a signal mixing section coupled to the passive equalizer section and comprising:
        a first transistor coupled to the first passive circuit at the first connection node and configured to receive a first signal therefrom; and
        a second transistor coupled to the second passive circuit at the second connection node and configured to receive a second signal therefrom,
    wherein the signal mixing section is configured to:
        mix the first signal and the second signal with respective frequency response characteristics; and
        generate an output signal.

2. The equalizer circuit of claim 1, wherein the passive equalizer section is coupled to two input nodes,
    wherein the first passive circuit includes:
        a first arm connecting a first input node of the two input nodes to the first branch node, the first arm including the first reactive component characterized by the first reactance and the first resistor characterized by the first resistance, wherein the first reactive component and the first resistor are connected in series at the first connection node; and
        a second arm mirroring the first arm and connecting a second input node of the two input nodes to the first common branch node, the second arm including a first mirror reactive component characterized by the first reactance and a first mirror resistor characterized by the first resistance, wherein the first mirror reactive component and the first mirror resistor are connected in series at a first mirror connection node; and
    wherein the second passive circuit includes:
        a third arm connecting the first input node of the two input nodes of the equalizer circuit to a second branch node, the third arm including the second reactive component characterized by the second reactance and the second resistor characterized by the second resistance, the second reactive component and the second resistor are connected in series at the second connection node; and
        a fourth arm mirroring the third arm and connecting the second input node of the two input nodes of the equalizer circuit to the second branch node, the fourth arm including a second mirror reactive component characterized by the second reactance and a second mirror resistor characterized by the second resistance, wherein the second mirror reactive component and the second mirror resistor are connected in series at a second mirror connection node; and
    wherein the signal mixing section includes two pairs of differential input terminals, wherein a first pair of differential input terminals are coupled to the first passive circuit at the first connection node and the first mirror connection node, and wherein a second pair of differential input terminals are coupled to the second passive circuit at the second connection node and the second mirror connection node.

3. The equalizer circuit of claim 2, wherein the signal mixing section includes a differential amplifier comprising:
    a first differential pair of transistors including:
        a first transistor including a first gate connecting to the first arm of the first passive circuit at the first connection node; and
        a second transistor including a second gate connecting to the second arm of the first passive circuit at the first mirror connection node; and
    a second differential pair of transistors including:
        a third transistor including a third gate connecting to the third arm of the second passive circuit at the second connection node; and
        a fourth transistor including a fourth gate connecting to the second fourth arm of the second passive circuit at the second mirror connection, wherein drain terminals of the first transistor and the third transistor are shorted together, and wherein drain terminals of the second transistor and the fourth transistor are shorted together.

4. The equalizer circuit of claim 2, wherein the first branch node and the second branch node are connected.

5. The equalizer circuit of claim 1, wherein the first passive circuit is a high-pass filter with a cut-off frequency determined by at least one of: the first reactance, or and the first resistance.

6. The equalizer circuit of claim 1, wherein the first passive circuit is operable as a high-pass filter with a first cut-off frequency determined by at least one of: the first reactance, or the first resistance, and the second passive circuit is operable as another high-pass filter with a second cut-off frequency determined by at least one of: the second reactance and the second resistance.

7. The equalizer circuit of claim 6, wherein the first and second cut-off frequencies are different.

8. The equalizer circuit of claim 3, wherein the first differential pair of transistors and the second differential pair of transistors are operable to jointly generate the output signal of the differential amplifier.

9. The equalizer circuit of claim 8, wherein a ratio of a magnitude of the output signal over a magnitude of the input signal is determined by an aspect ratio of a size of a constituent transistor from the second differential pair of transistors to a size of a constituent transistor from the first differential pair of transistors.

10. The equalizer circuit of claim 8, wherein a source terminal of the first transistor and a source terminal of the third transistor are shorted together, and wherein a source terminal of the second transistor and a source terminal of the fourth transistor are shorted together.

11. The equalizer circuit of claim 10, further comprising a connecting resistor that connects the source terminals of the first transistor and the third transistor to the source terminals of the second transistor and the fourth transistor.

12. The equalizer circuit of claim 11, wherein the connecting resistor is adjustable.

13. The equalizer circuit of claim 11, further comprising a connecting capacitor arranged in parallel with respect to the connecting resistor, the connecting capacitor connects the source terminals of the first transistor and the third transistor to the source terminals of the second transistor and the fourth transistor.

14. The equalizer circuit of claim 13, wherein the connecting capacitor is adjustable.

15. The equalizer circuit of claim 3, wherein source terminal of the transistors in the first differential pair are shorted together.

16. The equalizer circuit of claim 3, wherein source terminals of the transistors in the second differential pair are shorted together.

17. The equalizer circuit of claim 1, wherein the passive equalizer section further includes:
a third passive circuit arranged in parallel with respect to the first passive circuit and the second passive circuit, the third passive circuit coupled to the at least one input node, the third passive circuit comprising a third resistor, characterized by a third resistance, and a third reactive component, characterized by a third reactance, wherein the third reactive component is coupled to the third resistor at a third connection node, and wherein the third passive circuit is disposed between the at least one input node and a third branch node; and
wherein the signal mixing section further includes a plurality of transistors to mix signals with different frequency response characteristics, the plurality of transistors including:
a first transistor having a first gate coupled to the first passive circuit at the first connection node;
a second transistor having a second gate coupled to the second passive circuit at the second connection node; and
a third transistor having a third gate coupled to the third passive circuit at the third connection node.

18. The equalizer circuit of claim 17, wherein the first branch node, the second branch node, and the third branch node are connected.

19. An equalizer circuit, comprising:
a passive equalizer section coupled to at least one input nodes and configured to filter an input signal, the passive equalizer section including:
a first passive filter that comprises: a first resistor characterized by a first resistance, and a first reactive component characterized by a first reactance, wherein the first resistor and the first reactive component are in series and connected at a first connection node; and
a second passive filter that comprises: a second resistor characterized by a second resistance, and a second reactive component characterized by a second reactance, wherein the second resistor and the second reactive component are in series and connected at a second connection node, wherein the first passive filter and the second passive filter are in parallel; and
a signal mixing section comprising a plurality of transistors to mix signals with different frequency response characteristics.

20. The equalizer circuit of claim 19, wherein the passive equalizer section receives a fully-differential signal and the signal mixing section generates a fully-differential signal.

* * * * *

UNITED STATES PATENT AND TRADEMARK OFFICE
CERTIFICATE OF CORRECTION

PATENT NO. : 10,944,602 B1
APPLICATION NO. : 16/567721
DATED : March 9, 2021
INVENTOR(S) : Alan C. Rogers and Mohammad Mahdi Ahmadi Page 1 of 1

It is certified that error appears in the above-identified patent and that said Letters Patent is hereby corrected as shown below:

In the Claims

Column 16, Line 17, Claim 2, please delete "common branch" and insert therefor -- branch --; and Column 16, Line 63, Claim 3, please delete "second fourth" and insert therefor -- fourth --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*